United States Patent [19]
Hartmann et al.

[11] 3,992,346
[45] Nov. 16, 1976

[54] PRODUCTION OF HIGHLY FLEXIBLE COATINGS

[75] Inventors: Heinrich Hartmann, Limburgerhof; Ruprecht Kroker, Ludwigshafen; Herbert Spoor, Limburgerhof, all of Germany

[73] Assignee: Badische Anilin- & Soda-Fabrik Aktiengesellschaft, Ludwigshafen (Rhine), Germany

[22] Filed: Jan. 15, 1975

[21] Appl. No.: 541,246

Related U.S. Application Data

[63] Continuation of Ser. No. 338,757, March 7, 1973, abandoned.

[30] Foreign Application Priority Data

Mar. 8, 1972 Germany............................ 2211059

[52] U.S. Cl............................... 260/57 R; 260/31.6; 260/32.8 R; 260/33.2 R; 260/835; 260/850
[51] Int. Cl.².......................................... C08G 8/08
[58] Field of Search............... 260/75 R, 40 R, 31.6, 260/33.2 R, 32.8 R

[56] References Cited
UNITED STATES PATENTS

| 3,320,336 | 5/1967 | Duke | 260/75 R |
|---|---|---|---|
| 3,658,541 | 4/1972 | Jacoby et al. | 260/75 R |

FOREIGN PATENTS OR APPLICATIONS

| 2,032,965 | 2/1971 | Germany | 260/75 R |

*Primary Examiner*—J. Ziegler
*Attorney, Agent, or Firm*—Johnston, Keil, Thompson & Shurtleff

[57] ABSTRACT

Binders for coating agents, which are polycondensation products from equimolar amounts of aromatic dicarboxylic acids and diols which contain from 5 to 50% molar of the total diol amount of a neopentylglycol ester of hydroxypivalic acid and which have a melting point range of from 60° to 150° and a K value of from 20 to 45. The products are particularly suitable for coating strip metal.

8 Claims, No Drawings

PRODUCTION OF HIGHLY FLEXIBLE COATINGS

This is a continuation of application Ser. No. 338,757, filed Mar. 7, 1973, now abandoned.

This invention relates to the production of highly flexible coatings from saturated linear polyesters.

It is known that saturated linear polyesters and copolyesters have good hardness and adhesion to metals, as for example to iron and aluminum. They therefore gain increasing significance for coating strip metal (known as coil coating). Since the coated plates should be capable of stamping after baking they have to satisfy stringent requirements as regards flow, adherence, abrasion resistance, resistance to surface damage, flexibility and hardness. In the case of prior art polyesters the hardness/flexibility ratio is not satisfactory; polyester coatings having high surface hardness have tended to form cracks on deformation because of inadequate flexibility, whereas polyester coatings of high flexibility have not had the required surface hardness so that superficial damage such as scratch marks may occur.

U.S. Pat. No. 3,320,336 discloses the production of unsaturated polyesters having branched structures which contain up to 50% molar of neopentylglycol hydroxypivalate as a bifunctional hydroxy compound. These unsaturated polyester resins, after they have been crosslinked with olefinically unsaturated monomers, as for example styrene, in the presence of the conventional peroxides, are distinguished by particularly good resistance to hydrolysis and by good resistance to heat and oxidation. For coil coating however these unsaturated polyester resins are not suitable for technological reasons and because of inadequate flexibility of the coatings obtained therewith.

German Laid-Open Specification (DOS) No. 2,032,965 discloses polyesters based on polycondensation products of aromatic dicarboxylic acids or their esters, a lower aliphatic glycol, preferably ethylene glycol, and from 1 to 15% molar of neopentyl glycol hydroxypivalate. These are high molecular weight materials having melting points of more that 220° C which can be more easily colored with disperse dyes when a small amount of neopentylglycol hydroxypivalate is incorporated into the polymer chain but which are not suitable as surface coating binders because of their insolubility in the usual solvents.

It is an object of the present invention to provide polycondensation products which are based on saturated polyesters and are suitable as binders in surface coatings for the production of highly elastic coatings, particularly for coil coating.

The present invention consists in polycondensation products from:

a. 100% molar of at least one aromatic dicarboxylic acid or esterifiable derivative of the same which may if desired be partially replaced by an aliphatic and/or cycloaliphatic dicarboxylic acid or appropriate derivative;

b. from 50 to 95% molar of at least one diol of the general formula: $HO(CHR_n)OH$ in which R is hydrogen or methyl and $n$ is one of the integers from 2 to 10 and/or a gemdialkyl glycol of five to 11 carbon atoms; and c. from 5 to 50% molar of neopentylglycol hydroxypivalate; which have a melting point range of from 60° to 150° C, preferably from 75° to 125° C, and a K value of from 20 to 45, preferably from 30 to 40, measured in dimethylformamide, and their use as binders in surface coatings which if desired may additionally contain at least one organic solvent, pigment, filler and/or other conventional additives for surface coatings.

Those polycondensation products are particularly preferred which contain condensed into them from 10 to 35% molar of component (c). Application of the binder of the invention to the substrate to be coated in the form of a solution in at least one organic solvent is a preferred method.

The polyesters to be used as binders are linear polyesters.

The following details are given concerning the components from which the polyesters of the invention are built up:

a. The following are for example suitable as aromatic dicarboxylic acids or their esterifiable derivatives: phthalic acid, isophthalic acid, terephthalic acid, their anhydrides, for example phthalic anhydride, and preferably their esters with lower alcohols, as for example dimethyl isophthalate, dimethyl terephthalate and preferably dimethyl terephthalate and isopthalic acid.

the aromatic dicarboxylic acids and their derivatives may if desired be replaced to a small extent by aliphatic and/or cycloaliphatic dicarboxylic acids or their esterifiable derivatives. Examples of these are succinic acid, succinic anhydride, adipic acid and sebacic acid which should not be used for modification in amounts exceeding 20%, preferably 10%, by weight of the total amount of component (a), and also hexahydrophthalic acid and its anhydride, tetrahydrophthalic anhydride, hexahydroisophthalic acid, and hexahydroterephthalic acid or their diesters which may be used in amounts of up to 20% and preferably up to 10% by weight of component (a).

b. Examples of suitable aliphatic diols are the saturated linear or branched aliphatic diols of two to ten carbon atoms and the gemdialkylglycols. Examples of alkylene glycols are ethylene glycol, butylene glycol-1,3, butanediol-1,4, hexamethylene glycol-1,6 and as gemdialkylglycols for example 2,2-dipropyl-1,5-pentanediol, 2,2-dimethyl-1,3-propanediol and 2,2-diethyl-1,3-propanediol.

Preferred suitable components (b) are 2,2-dimethylpropanediol-1,3 or hexanediol-1,6 and also mixtures of 2,2-dimethylpropanediol-1,3 with hexanediol-1,6. Component (b) is contained in the polycondensation product of the invention in an amount of from 50 to 95%, preferably from 60 to 70%, molar.

c. Neopentyl glycol hydroxypivalate is contained in the polycondensation product of the invention in an amount of from 5 to 50%, preferably from 10 to 35%, molar as condensed units. Triols such as trimethylolpropane or glycerol may be used in small amounts in special cases.

The linear polyesters of the invention may be prepared by the same general methods as those used for the production of other linear polyesters, i.e. by the direct method or by the transesterification method. They are preferably prepared by the transesterification method, a molar ratio of the glycol components (b) + (c) to the dicarboxylic esters (a) of from 1:1 to about 5:1 being used, but a molar ratio of from about 3:1 to about 1.8:1 being preferred. The transesterification reaction is usually carried out at atmospheric pressure in an atmosphere of an inert gas such as nitrogen, advantageously in the presence of suitable catalysts, the usual temperature range being from about 150° to 230°

C. The alkyl alcohol corresponding to the dialkyl ester of the dicarboxylic acid which is thus eliminated is advantageously removed continuously by distillation. The reaction is generally over after about three to four hours, the desired polyester prepolymer having been formed.

Any of the generally known transesterification catalysts, as for example lithium hydroxide, lithium amide or zinc acetate, may be used to catalyze the transesterification. In most cases the transesterification catalyst is used in a concentration of from 0.01 to 0.2% based on the weight of the dialkyl ester of the dicarboxylic acid.

Polycondensation of the prepolymer is carried out by adding a suitable polycondensation catalyst and heating, the pressure being reduced in stages to about 1 mm while stirring and the reaction temperature raised to about 280° C. The conventional polycondensation catalysts may be used, for example antimony oxalate, germanium dioxide or antimony monoxide.

Particularly favorable catalysts both for the transesterification and the condensation are titanium compounds, as for example tetraisobutyltitanate and tetrabutyl titanate.

The dicarboxylic acid component (a) and the diol components (b) + (c) are present in the polycondensation products of the invention in about an equimolar ratio and the diol components (b) + (c) are advantageously contained therein in a slight excess.

The polycondensation products of the invention have a melting point range of from 60° to 150° C measured by means of a conventional heated stage microscope. Polycondensation products which have a melting point range of from 75° to 125° C are preferred for use according to the invention.

Polycondensation products according to the invention also generally have K values measured as 2% solutions in dimethylformamide (Fikentscher, Cellulosechemie, 13, 58 (1932) of from 25 to 45, preferably from 30 to 40, and hydroxyl values of from 4 to 35, preferably from 7 to 25, as well as acid numbers of from 0.2 to 3. They are soluble in organic solvents or solvent mixtures, as for example cyclohexanone, methyl isobutyl ketone, dioxane, methyl glycol acetate, ethyl glycol acetate, butyl glycol acetate, dimethyl formamide, a mixture of butyl acetate: xylene: SOLVESSO 100 (Trade Mark): ethyl glycol acetate 30:30:20:20, a mixture of butyl glycol acetate: SOLVESSO 100 50:50, a mixture of diacetone alcohol:xylene 50:50, a mixture of isophorone: SOLVESSO 150 50:5 or a mixture of methyl isobutyl ketone:xylene 50:50, and are preferably used in the form of their solutions.

Solutions of the polycondensation products of the invention are suitable alone or mixed with conventional additives for the production of coatings on various substrates, as for example metal and plastics and preferably on metal surfaces.

After the surface coating has been applied to the substrate to be coated the solvent or solvent mixture is removed by exposure to the air, at elevated temperature or by the use of subatmospheric pressure. In the coil coating method the coating is applied for example to the metal strip to be coated by means of an applicator conventionally used for this method and baked at article temperatures of from 180° to 240° C, preferably from 200° to 230° C, which should be reached within forty-five to three hundred seconds.

The following are examples of additives which may be used together with the binder and a solvent in the coating agent: pigments, as for example titanium dioxide, iron oxide yellow pigments and iron oxide red pigments, fillers, as for example heavy spar, microtalc, quartz powder, organic or inorganic dyes, as for example metal complex dyes, flow improvers, as for example polyvinylbutyrals, or silicone oils, flatting agents, as for example colloidally dispersed silicic acid, small amounts of other synthetic resins, as for example epoxy resins, urea-formaldehyde resins, melamine/benzoguanamine/formaldehyde resins and other usual additives.

Polycondensation products according to the invention are particularly suitable for coil coating.

Coatings prepared using polycondensation products of the invention as binders are distinguished from conventional coatings by outstanding flexibility and adhesion so that metal coated therewith may be stamped and strongly formed. Another advantage of polycondensation products according to the invention when used as binders for coatings is their good weather resistance.

The following Examples illustrate the invention. The parts and percentages specified in the Examples are by weight unless stated otherwise.

EXAMPLE 1

784 g of dimethyl terephthalate (4 moles), 292 g of neopentyl glycol hydroxypivalate (2.8 moles), 177 g of hexanediol-1,6 (1.5 moles), 279 g of ethylene glycol (4.5 moles), 0.120 g of zinc acetate and 0.150 g of antimony monoxide are weighed into a four-necked condensation vessel which is fitted with a stirrer, a nitrogen inlet tube, a distillation column and a condenser with a receiver and a vacuum line. The reaction mixture is melted under nitrogen. Transesterification begins at an internal temperature of about 160° C and lasts about three to four hours. The temperature is raised from 160° C to about 220° C and the transesterification proceeds practically quantitatively. For polycondensation the internal temperature is raised within one hour from 220° to 245° C and the pressure is decreased from 760 mm to about 1 to 2 mm. The temperature is then raised from 245° C to from 265° to 270° C (1 to 2 mm) and condensation is continued for from 2 to 2½ hours.

Data: acid number 0.8
hydroxyl number 19
K value at 25° C (2% in dimethylformamide): 32.0
Melting range: 76° to 87° C.

COMPARATIVE EXAMPLE A

Exactly the same procedure as in Example 1 is followed but using the following mixture:

776 g of dimethyl terephthalate (4 moles)
418 g of neopentyl glycol (4 moles)
147 g of hexanediol-1,6 (1.25 moles)
217 g of ethylene glycol (3.5 moles)
0.120 g of zinc acetate and
0.150 g of antimony trioxide.
Data of the resin:
acid number: 1.5
OH number: 12
K value at 25° C (2% in dimethylformamide): 35.
Viscosity number at 25° C (phenol/tetrachloroethane 6:4):82.5

Melting range: 68° to 80° C.

Production of coating mixture (for Example 1 and Comparative Example A):

62.5 g of polyester resin (40% in SOLVESSO 100 and ethyl glycol acetate 1:1) and
25 g of titanium dioxide RN 59.

The coating mixture is diluted with about 30 g of SOLVESSO 100/ethyl glycol acetate, applied by knife coating to deep drawing sheet metal and baked for ninety seconds at 325° C. The results of tests are given in the following Table:

The Tables give the following data:
LT = layer thickness in microns
Gloss = gloss according to Lange
PH = pendulum hardness in seconds
D = Deepdrawing test (from 0 to 5, 0 being good and 5 unsatisfactory)
TB = T-bend 1 or 2T, very good; more than 4T unsatisfactory.

TABLE 1

| Example | Properties of the baked coating | | | | |
|---|---|---|---|---|---|
| | LT | Gloss | PH | D | TB |
| 1 | 24 | 52 | 120 | 0 | 1–2T |
| A | 22 | 52 | 120 | 1 | 6T |

The resin with neopentylglycol hydroxypivalate not only has greater surface hardness but exhibits outstanding values in the cup test and very good values in the T-bend test (cf. test methods of the National Coil Coaters Association, Philadelphia, USA; measure of flexibility and deformability).

EXAMPLE 2

The following are weighed into an apparatus as described in Example 1:

784 g of dimethyl terephthalate (4 moles)
396 g of neopentyl glycol (3.8 moles)
118 g of hexanediol-1,6 (1 mole)
186 g of ethylene glycol (3 moles)
204 g of neopentylglycol hydroxypivalate (1 mole)
0.120 g of zinc acetate.

The reaction mixture is melted under nitrogen. Transesterification begins at an internal temperature of 160° C and this is raised in from 3 to 3½ hours to 220° C. After this period the transesterification is practically quantitative.

0.180 g of germanium dioxide is added for the polycondensation, the internal temperature is raised within one hour from 220° to 250° C and the pressure is decreased to about 1 to 2 mm. The temperature is then raised to 270° to 275° C and condensation is continued for about another 2 hours.

Data of the resin:
Acid number: 0.8
Hydroxyl number: 24
Melting point range: 74° to 84° C.

Production of coating mix:

62.5 g of polyester resin, 40% in SOLVESSO 100/ethyl glycol acetate 1:1
25 g of titanium dioxide RN 59.

After pigmentation the whole is diluted with 30 g of the above solvent mixture, applied by knife coating to deep drawing sheet metal and baked for ninety seconds at (a) 325° C and (b) 350° C.

| Example | Test results of properties of coating | | | | |
|---|---|---|---|---|---|
| | LT | Gloss | PH | CT | TB |
| 2(a) | 22 | 56 | 126 | 0 | 1–2T |
| 2(b) | 24 | 55 | 136 | 0 | 1–2T |

COMPARATIVE EXAMPLE (DOS No. 2,032,965)

A condensation product is prepared according to Example 3 of DOS No. 2,032,965 from 600 parts of dimethyl terephthalate, 372 ml of ethylene glycol and 67.2 parts of neopentyl glycol hydroxypivalate. The melting range of the product is from 215° to 240° C. The product is insoluble in conventional solvents such as ethyl glycol acetate, SOLVESSO 100/ethyl glycol acetate 1:1, n-butyl acetate and methyl ethyl ketone. The resin is moreover insoluble in dimethylformamide and therefore cannot be used for the purposes of the invention.

EXAMPLE 3

4 moles (776 g) of dimethyl terephthalate, 5 moles (310 g) of ethylene glycol, 2 moles (236 g) of hexanediol-1,6 and 2 moles (408g) of neopentyl glycol hydroxypivalate are condensed under the conditions specified in Example 1 in the presence of 120 mg of zinc acetate and 300 mg of antimony acetate to form a polyester resin.

Data:
acid number: 2.3
hydroxyl number: 21
K value at 25° C (2% in dimethylformamide) = 26
melting range: from 79° to 86° C.

The resin can be dissolved 60% in SOLVESSO 150 and processed into hard and very flexible films.

When the resin, pigmented for example 1:1 with titanium dioxide, is processed analogously with an addition of a small amount of a commercial melamine resin, the T-bend test can be further improved while maintaining the hardness.

We claim:

1. A surface coating which contains as a binder a saturated linear polyester which consists of units of:
   a. 100% molar of at least one dicarboxylic acid selected from the group consisting of phthalic acid, isophthalic acid, terephthalic acid, phthalic anhydride, and esters of said acids with lower alcohols
   b. from 50 to 95% molar of at least one diol selected from the group consisting of diols of the formula HO(CHR)$_n$OH in which R is hydrogen or methyl and $n$ is one of the integers from 2 to 10 and gem-dialkylglycols of five to eleven carbon atoms; and
   c. from 5 to 50% molar of neopentylglycol hydroxypivalate;

wherein said linear polyester has a melting point range of from 60° to 150° C; a K value of from 20 to 45 measured in dimethylformamide; and is soluble in organic solvents such as cyclohexanone, methyl isobutyl ketone, dioxane, methyl glycol acetate, ethyl glycol acetate and butyl glycol acetate.

2. A surface coating as set forth in claim 1 wherein the saturated linear polyester contains units of from 10 to 35% molar of component (c).

3. A surface coating as set forth in claim 1 wherein the saturated linear polyester has a melting point range of from 75° to 125° C and a K value of from 30 to 40.

4. A surface coating as set forth in claim 1 wherein component (b) is at least one diol from the group consisting of 2,2-dimethylpropanediol-1,3 and hexanediol-1,6.

5. A surface coating as set forth in claim 1 wherein component (a) is at least one dialkyl ester of an aromatic dicarboxylic acid.

6. A surface coating as set forth in claim 1 wherein component (a) is dimethyl terephthalate.

7. An article which has been coated with a surface coating as set forth in claim 1.

8. A surface coating as set forth in claim 7 wherein up to 20% by weight of component (a) is replaced by at least one dicarboxylic acid selected from the group consisting of succinic acid, adipic acid, sebacic acid, hexahydrophthalic acid, hexahydroisophthalic acid and hexahydroterephthalic acid or an esterifiable derivative thereof.

* * * * *